United States Patent
Wichmann

[15] 3,661,178
[45] May 9, 1972

[54] MAGNETICALLY LINKED BIPROPELLANT VALVE

[72] Inventor: Horst Wichmann, Canoga Park, Calif.

[73] Assignee: CCI Aerospace Corporation, Van Nuys, Calif.

[22] Filed: Jan. 9, 1970

[21] Appl. No.: 1,738

[52] U.S. Cl.............................137/595, 251/141, 335/274, 267/162
[51] Int. Cl....................F16k 11/10, F16k 31/02, H01f 7/06
[58] Field of Search....................137/595; 251/77, 129, 139, 251/141; 267/161, 162; 335/274

[56] References Cited

UNITED STATES PATENTS

| 3,443,585 | 5/1969 | Reinicke | 251/141 X |
| 3,521,854 | 7/1970 | Leiber et al. | 251/141 X |

Primary Examiner—Henry T. Klinksiek
Attorney—Robert E. Geauque

[57] ABSTRACT

A plurality of valve elements, each valve element functioning to open and close a fluid passage, all valve elements operating simultaneously by a common magnetic field, each valve element being supported by an axial guidance flexure comprising a plurality of discs with spaces therebetween, each disc having a plurality of grooved cut-out sections which permit limited axial movement of the outer circumference of the disc with respect to the inner portion of the disc.

17 Claims, 7 Drawing Figures

HORST WICHMANN
INVENTOR.

BY R.E. Geauque
ATTORNEY

HORST WICHMANN
INVENTOR.

BY R.E. Geangue
ATTORNEY

HORST WICHMANN
INVENTOR.

BY R.E. Beanque
ATTORNEY

MAGNETICALLY LINKED BIPROPELLANT VALVE

BACKGROUND OF THE INVENTION

In the employment of a rocket engine the fuel and an oxidizer are mixed together in the combustion chamber. It is necessary to combine the fuel and oxidizer in a reasonably accurate proportionate with the valves for regulating the flow of each to operate simultaneously. Besides the problem of getting the valves to operate simultaneously, many other problems are encountered due to the normal environment of a rocket engine. For example, substantial temperature variation between the oxidizer and fuel usually exists (frequently in excess of 300° F.). Such temperature change causes a substantial variation in time of the valve response with most common materials of construction. Vibration of the rocket engine substantially hinders valve operation. Also, many of the propellants are quite corrosive.

Heretofore, there have been a few attempts at designing an adequate dual valve arrangement with the most successful arrangement employing a mechanical linkage which uses a common actuator. It is common in a mechanically linked valve to employ a thin wall pressure vessel (such as a bellows or a flexure tube) to transmit motion and at the same time contain high pressure propellants. This thin wall pressure vessel has been proven to be the most unreliable part of the mechanically linked bipropellant valve and has resulted in numerous failures despite many years of development.

Further, in the mechanically linked valve arrangements the poppets are usually conventionally spring biased to the closed position. The conventional method of poppet support permits sufficient radial movement of the poppet to prevent the poppet from seating adequately thereby causing leakage. In an effort to facilitate poppet seating a conical seat is common which provides for self-alignment of the poppet. However, in conical seats a small amount of slippage is ever present which after a period of time causes sufficient abrasion to result in substantial leakage.

SUMMARY OF THE INVENTION

The valve assembly of this invention features two poppets (oxidizer and fuel) in parallel physically, but in series magnetically, each poppet being flexure mounted to provide perfect axial guidance without sliding parts. The common actuator for the poppets comprises a magnetic field producing coil located equidistantly from each poppet. Each flexure comprises a series of discs with spacers being laminated therebetween. Each disc has adjacentto its outer edge a cut-out groove which extends short of 360°. A second such groove is located on each disc adjacent the interior circumference of the disc. The grooves of each disc are arranged so the solid portion of each groove is locatinglyspaced approximately 180° from each other. Each flexure usually comprises three in number of such discs, with the solid portion of the outer groove of each disc being angularly displaced approximately 120° from the adjacent disc or discs. This arrangement results in a large moment arm and a much more compact flexure than could be obtained with a diaphragm or spider type flexure. The poppet of each valve has a flat seating arrangement thereby not permitting sliding action of the poppet with respect to the seat. The poppet may be supported by oppositely spaced ribs in a first plane within an inner frame, the inner frame supported by oppositely spaced ribs in a second plane within an outer frame, the first plane being at 90° to the second plane.

DETAILED DESCRIPTION OF THE SHOWN EMBODIMENTS

Figure 1:
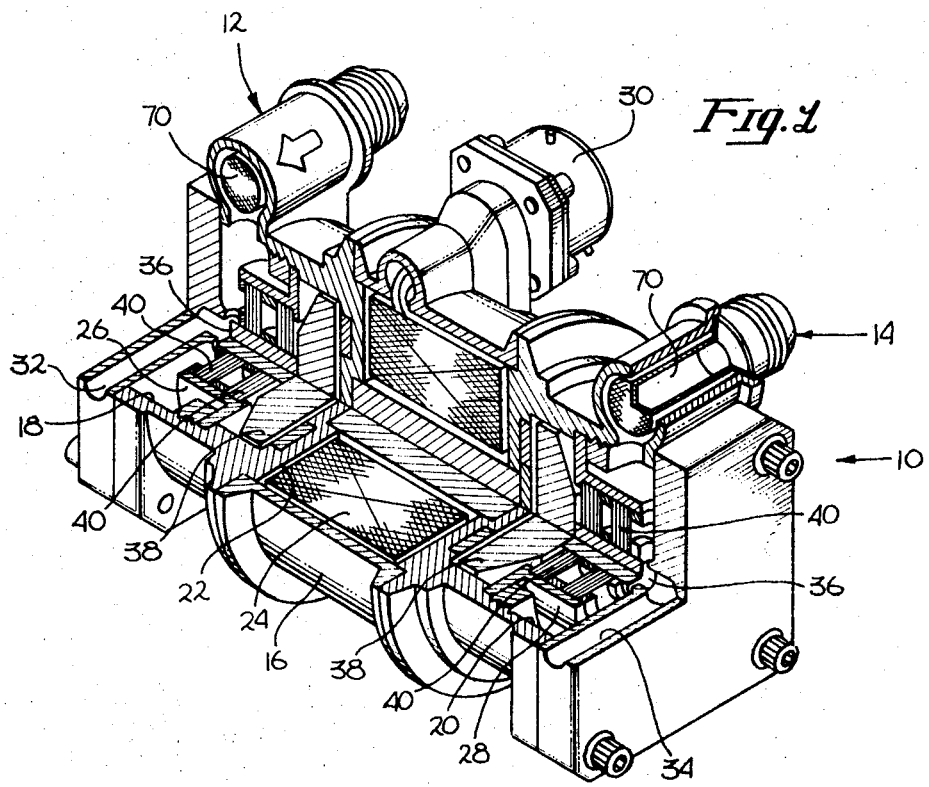
FIG. 1 is a cut-away partly-in-section perspective view of a first embodiment of this invention.

Referring particularly to the drawings, there is shown in FIG. 1 a first embodiment 10 of the valve assembly of this invention. Assembly 10 includes a fuel inlet 12 and a separate spaced therefrom oxidizer inlet 14. Inlets 12 and 14 are attached to a valve housing 16 which contains separate and spaced apart fuel chamber 18 and oxidizer chamber 20. Located between fuel chamber 18 and oxidizer chamber 20 is a coil chamber 22 within which is secured an electrical magnetic field producing coil 24. An electrical connector housing 30 is secured to valve housing 16 and permits the transmission of the necessary electrical current to activate coil 24. Within fuel chamber 18 is fixedly secured a first poppet valve support 26 and within oxidizer chamber 20 is fixedly secured a second poppet valve support 28. A fuel outlet 32 and an oxidizer outlet 34 is provided within valve housing 16.

Each of the poppet valve assemblies, to be described hereafter, mounted within the supports 26 and 28 are identical in construction with like numerals referring to similar elements. A poppet valve 36 is supportingly mounted by a flexure assembly 40 within each of the supports 26 and 28. Each of the poppets 36 has a main enlarged body portion referred to as an armature 38. The poppets 36 function to open and close their respective fuel and oxidizer passages 32 and 34. Each poppet 36 is shown being supported by two (in number) flexures 40. However, it is to be within the scope of this invention to employ more or less flexures 40 per poppet 36.

Figure 3:
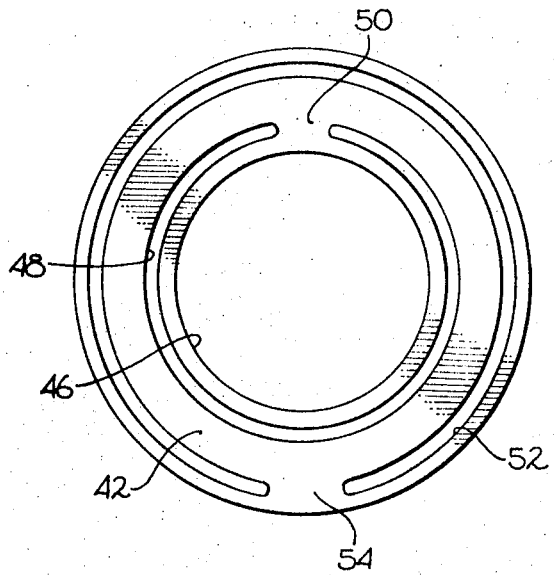
FIG. 3 is a front view of a flexure disc employed in this invention.
Figure 4:
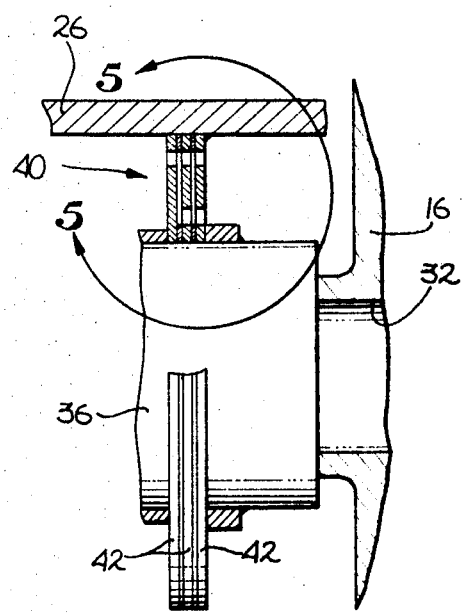
FIG. 4 is a partly-in-section side view showing in greater detail the flexure assembly of this invention.
Figure 5:
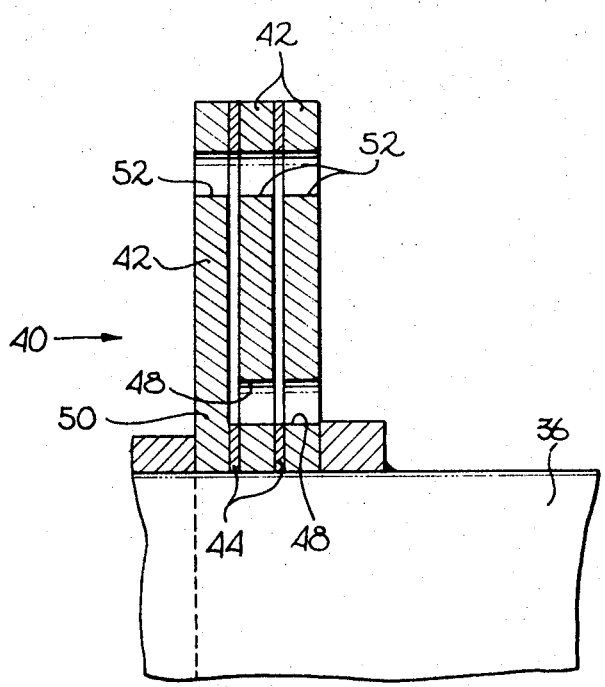
FIG. 5 is an enlarged sectional view of the flexure of this invention taken along line 5—5 of FIG. 4.

The construction of each flexure 40 will now be described in detail with particular reference to be had to FIGS. 3, 4 and 5 of the drawings. Each flexure 40 is formed of three discs 42 and two spacers 44 separating the discs 42. Each disc 42 has a central opening 46 therein which is to surround in a tight fitting manner each poppet 36. Adjacent to the periphery of the opening 46 is a first slot 48 which extends approximately 340° having a solid portion 50 of approximately 20° of angle. Located adjacent the outer periphery of each disc 42 is a second similar slot 52 extending approximately 340° in angle leaving approximately 20° in angle of a solid portion 54. The placement of slots 48 and 52 is such that the solid portions 50 and 54 are opposite each other, that is, 180° apart center to center. In constructing each flexure 40 the solid portions of the second disc is angularly displaced from the adjacent disc by 120°, that is, the first disc has a 0° loading, the second disc a 120° loading, and the third disc a 240° loading.

Figure 2:
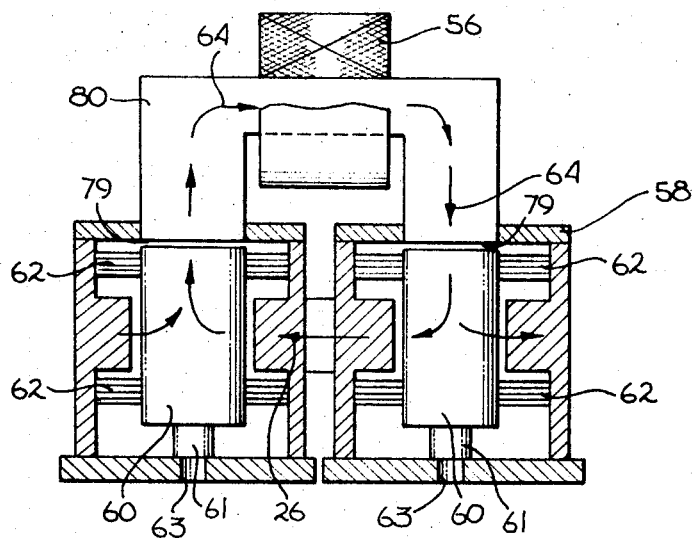
FIG. 2 is a diagrammatic sectional front view of a second embodiment of this invention.

The second embodiment of this invention (shown in FIG. 2) is similar to that of FIG. 1 except the coil 56 is mounted above valve housing 58 and centrally between armatures 60. Each armature 60 is supportingly held by flexures 62. Attached to the end of each armature 60 is a poppet 61 which functions to close their respective openings 63. The armatures 60 are capable of being removed from their seated position upon activation of coil 56 which creates a magnetic field represented by arrows 64. The diagrammatic showing of the second embodiment of FIG. 2 is to represent that it is not necessary to maintain the coil 56 physically between the armatures 60. It is only necessary that the armatures be in series magnetically and not physically in series.

Figure 6:
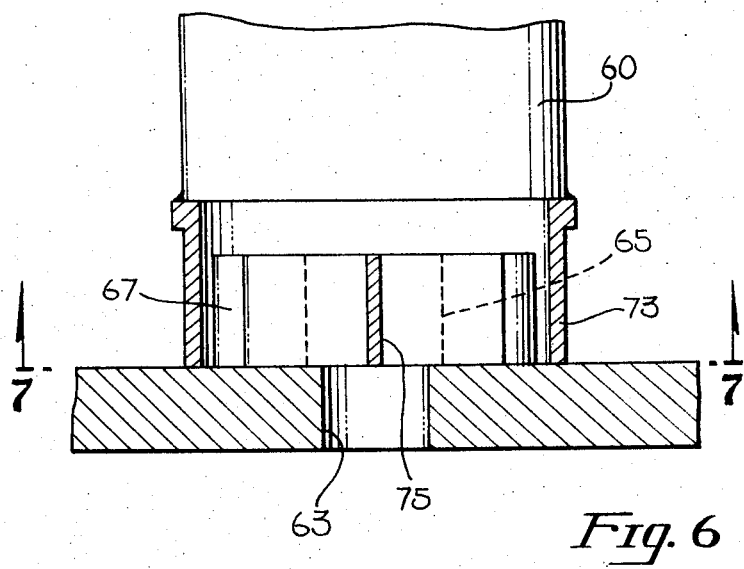
FIG. 6 is a partly-in-section view of a second embodiment of a poppet of this invention.
Figure 7:
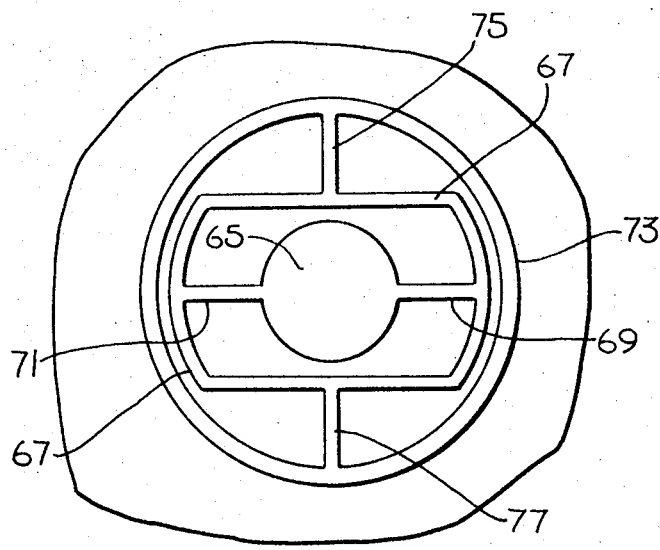
FIG. 7 is a front view of the poppet of FIG. 6 taken along line 7—7 of FIG. 6.

In FIGS. 6 and 7 a different type of poppet structure 65 is shown. In FIG. 2 the poppets 61 are fixedly secured to their respective armatures 60. Poppets 65 are secured within an inner frame 67 by diametrically opposite ribs 69 and 71, with ribs 69 and 71 lying within a first plane. Inner frame 67 is supported within an outer frame 73 by diametrically opposite ribs 75 and 77, with ribs 75 and 77 lying within a second plane.

The first plane is angularly displaced substantially 90° from the second plane. The inner frame 67 is substantially rectangular in configuration with the outer frame 73 being substantially circular in configuration. Outer frame 73 of each poppet 65 is to be fixedly secured as by welding to an armature 60.

The operation of the valve assembly of this invention is as follows: It is to be understood that the foregoing operation description will be applicable to either the first or second embodiment, although the description will refer by reference numeral to only the first embodiment. It will be assumed that the poppets 36 are seated thereby preventing flow of the oxidizer and fuel through their respective outlets 34 and 32. With the poppets 36 seated the flexures 40 provide a small seating force. Also, when the valve assembly is pressurized with propellant, a substantial pressure force is exerted upon each poppet by the oxidizer and the fuel, thereby assuring no leakage. It is to be noted that the seating arrangement of the poppets 36 is substantially planar which is substantially different from the normal conical form of seat. It has been found that abrasive slippage occurs in the conical form of seat which in turn after a short period of use causes leakage about the poppets 36.

Upon electrical activation of coil 24 a magnetic field is created through each poppet armature 38. Removal of each of the poppets 36 from its respective seat is thereupon effected, thereby permitting flow of fuel and oxidizer through their outlets 32 and 34. The particular physical arrangement of the coil 24 and the poppets 36 is variable as long as the poppets are in magnetic series with the coil.

The flexures 40 permit longitudinal movement of the poppets 36 with respect to the supports 26 and 28 due to the arrangement and placement of the slots 48 and 52 within each of the discs 42. The outer ring element (radially exterior of slot 52) is movable axially with respect to the middle ring (between slots 48 and 52) and the middle ring is movable in a like manner with respect to the inner ring (radially interior of slot 48). By the arranging of the solid portions 50 and 54 of each disc directly opposite each other and the locating of the angular spacing of 120° between the discs, substantially identical longitudinal movement is effected throughout the entire disc circumference throughout the entire flexure unit. The spacers 44 function to prevent friction between adjacent discs which would preclude the longitudinal movements of the discs.

The discs 42 and the spacers 44 are welded to each armature 38 and to the respective support 26 and 28 forming an integral unit and allowing for no radial movement of the armature 38. Radial movement would result in poppet wear which ultimately would cause fuel and oxidizer leakage. The entire flexure unit 40 is physically sized to be tight fittingly installed within each support 26 or 28. The flexures 40 are essentially vibration resistant and have extremely long life.

The function of the unique supporting arrangement of the poppet 65 is as follows: To unseat the poppet 61 the solenoid 56 force must be sufficient to close the air gap 79 between the armatures 60 and the solenoid housing 80 and further sufficient to unseat the poppets 61. It has been found that the force to close the gap 79 is approximately equal to the force required to unseat the poppet 61. Therefore, if the armature 60 could be moved prior to moving the poppet 61 instead of moving both simultaneously, the force requirements of the solenoid 56 could be decreased approximately by 50 percent. By mounting of poppet 65, such can be accomplished. Upon actuation of solenoid 56, the armatures 60 move longitudinally the distance of each gap 79. In this position the poppet 65 is still seated with the inner frame 67 having moved longitudinally a small distance with respect to poppet 65 and outer frame 73 also moving a small longitudinal distance with respect to inner frame 67. The loss of gap 79 has now been eliminated and the full force of solenoid 56 can be applied to unseat the poppet 65 which now occurs with a snap action. In essence, the ribs 69, 71, 75 and 77 mount the poppets 65 as by a spring action.

The magnetically linked bipropellant valve 10 of the invention may be viewed as three distinct components: oxidizer valve, fuel valve, and common actuator. Either one of these components may be changed quite significantly (increase in stroke for higher thrust levels, decrease in actuator power consumption, etc.) without requiring much change in the other components. This design concept is attractive from the aspect of flexibility.

The valve assembly 10 of this invention includes inlet filters 70 for protection of sealing surfaces. These filters 70 are arranged so that routing of the propellant about the coil 24 occurs thereby providing cooling of the coil 24. This cooling feature permits the use of higher power levels in the coil 24 and thereby results in faster valve response and improved response repeatability.

What is claimed is:

1. A flexure unit for permitting limited longitudinal movement of a first member with respect to a second member comprising:

said flexure unit comprising a plurality of discs, each of said discs having a central opening, said discs to be positioned adjacent each other with alignment of said central openings, said first member being located within the confines of said central openings and fixedly secured to said discs, the outer periphery of said discs to be fixedly secured to said second member;

each of said discs having an outer slot adjacent to the disc outer periphery and an inner slot adjacent to said central opening, each of said slots being substantially circular but not continuous in that a solid portion of said disc breaks the continuity of each of said slots, said slots being such that each of said discs is divided into an outer ring element movable with respect to a middle ring element and the middle ring element being movable with respect to an inner ring element, said solid portion of a said disc being non-aligned with a solid portion of an adjacent disc within said flexure unit.

2. An apparatus as defined in claim 1 wherein:

each of said discs being formed of a substantially non-magnetic material.

3. A flexure unit for permitting limited longitudinal movement of a first member with respect to a second member comprising:

said flexure unit comprising a plurality of discs, each of said discs having a central opening, said discs to be positioned adjacent each other with alignment of said central openings, said first member being located within the confines of said central openings and fixedly secured to said discs, the outer periphery of said discs to be fixedly secured to said second member;

each of said discs having an outer slot adjacent to the disc outer periphery and an inner slot adjacent to said central opening, each of said slots being substantially circular but not continuous in that a solid portion of said disc breaks the continuity of each of said slots, said slots being such that each of said discs is divided into an outer ring element movable with respect to a middle ring element and the middle ring element being movable with respect to an inner ring element;

spacers are included between adjacent discs to eliminate friction between discs which would hinder the degree of movement of said first member with respect to said second member.

4. An apparatus as defined in claim 3 wherein:

said solid portion of said outer slot of each disc being located substantially 180° from said solid portion of said inner slot of the same disc with respect to the center point of said central opening within the aforesaid disc.

5. An apparatus as defined in claim 4 wherein:

the respective solid portions of said outer slot of each of said discs being angularly displaced from an adjacent disc, said angular displacement of adjacent discs being equal in degree.

6. An apparatus as defined in claim 5 wherein:

a first disc and a second disc and a third disc are employed in said flexure unit, said angular displacement of said second disc being 120° with respect to said first disc, said angular displacement of said third disc being 120° with respect to said second disc.

7. A valve assembly for the direct proportionment of a fuel component and an oxidizer component in an engine combustion chamber, a first valve unit for controlling the flow of fuel and a second valve unit for controlling the flow of oxidizer, the improvement comprising:

a common actuator for operating said first valve unit and a second valve unit, said actuator comprising an electrical magnetic field producing coil, each of said first and second valve units being arranged in magnetic series with said coil so that upon activation of said coil said first and second valve units operate substantially simultaneously, said first valve unit including a first member which directly controls the flow of fuel, said second valve unit also including a first member which directly controls the flow of oxidizer; and a flexure unit connected to each of said first members to permit a limited amount of longitudinal movement of said first members relative to a second member, each of said flexure units applying a constant bias tending to maintain closure of its respective said valve unit.

8. An apparatus as defined in claim 7 wherein:
each of said flexure units comprising a plurality of discs, each of said discs having a central opening, said discs to be positioned adjacent each other with alignment of said central openings, said first member being located within the confines of said central openings and fixedly secured to said discs, the outer periphery of said discs to be fixedly secured to said second member;

each of said discs having an outer slot adjacent to the disc outer periphery and an inner slot adjacent to said central opening, each of said slots being substantially circular but not continuous in that a solid portion of said disc breaks the continuity of each of said slots, said slots being such that each of said discs is divided into an outer ring element movable with respect to a middle ring element and the middle ring element being movable with respect to an inner ring element, said solid portion of a said disc being non-aligned with a solid portion of an adjacent disc within each of said flexure units.

9. An apparatus as defined in claim 8 wherein:
each of said discs being formed of a substantially non-magnetic material.

10. An apparatus as defined in claim 9 wherein:
spacers are included between adjacent discs to eliminate friction between discs which would hinder the degree of movement of said first member with respect to said second member.

11. An apparatus as defined in claim 10 wherein:
said solid portion of said outer slot of each disc being located substantially 180° from said solid portion of said inner slot of the same disc with respect to the center point of said central opening within the aforesaid disc.

12. An apparatus as defined in claim 11 wherein:
the respective solid portions of said outer slot of each of said discs being angularly displaced from an adjacent disc, said angular displacement of adjacent discs being equal in degree.

13. An apparatus as defined in claim 12 wherein:
a first disc and a second disc and a third disc are employed in said flexure unit, said angular displacement of said second disc being 120° with respect to said first disc, said angular displacement of said third disc being 120° with respect to said second disc.

14. A mounting assembly for connecting a poppet valve to an armature, said armature being axially movable from a first position to a second position, said mounting assembly comprising:

an outer ring being secured to said armature;
an inner ring being connected to said outer ring by a first flexible rib assembly, said first rib assembly permitting axial movement of said inner ring with respect to said outer ring;
said poppet valve being located interiorly of said inner ring, a second flexible rib assembly supporting said poppet valve within said inner frame, said second rib assembly permitting axial movement of said poppet valve with respect to said inner ring.

15. An apparatus as defined in claim 14 wherein:
said first rib assembly comprises a first pair of rib elements being located diametrically opposite each other with respect to said poppet valve, said second rib assembly comprises a second pair of rib elements being located diametrically opposite each other with respect to said poppet valve.

16. An apparatus as defined in claim 15 wherein:
said first pair of rib elements being located within a first plane, said second pair of rib elements being located within a second plane, said first plane being angularly displaced from said second plane.

17. An apparatus as defined in claim 16 wherein:
said angular displacement being approximately 90°.

* * * * *